UNITED STATES PATENT OFFICE.

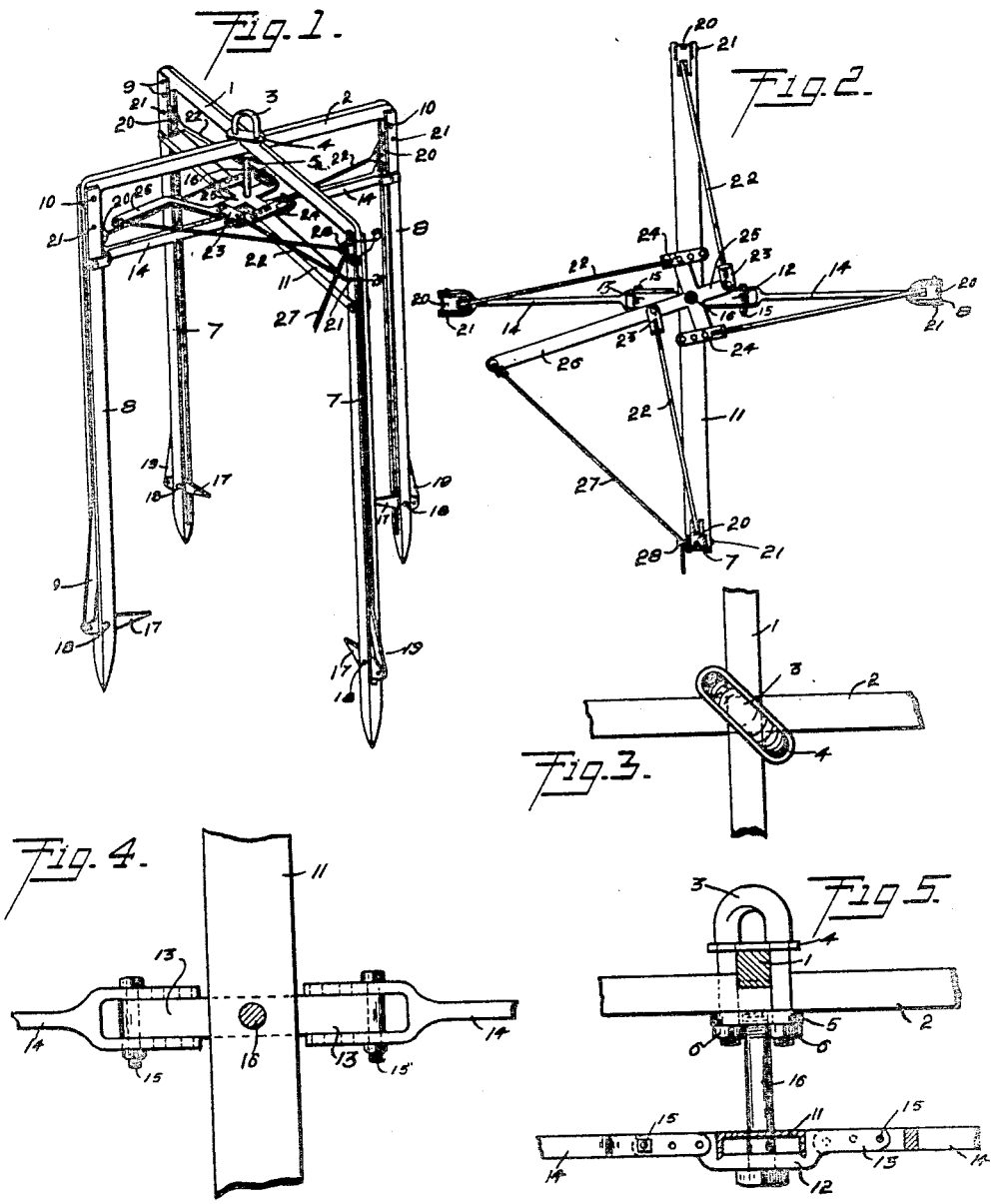

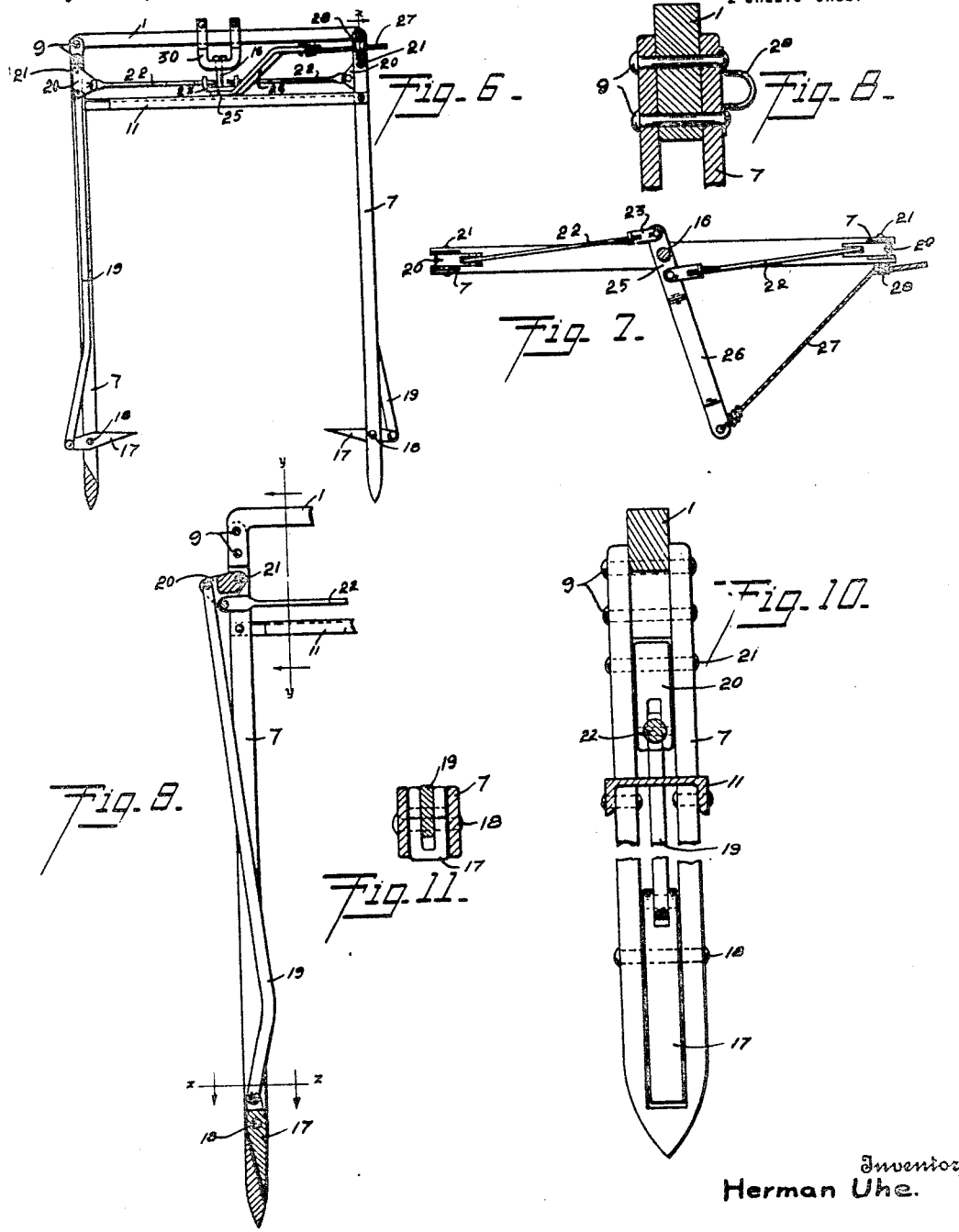

HERMAN UHE, OF SARPY COUNTY, NEBRASKA.

HAY-FORK.

1,149,480.

Specification of Letters Patent.

Patented Aug. 10, 1915.

Application filed November 18, 1913. Serial No. 801,762.

*To all whom it may concern:*

Be it known that I, HERMAN UHE, a citizen of the United States, and a resident of Sarpy county, in the State of Nebraska, have invented certain new and useful Improvements in Hay-Forks, of which the following is a specification.

My invention relates to hay forks for use in loading and unloading hay, straw and the like.

It is the object of my invention to provide in a fork of this kind an improved trip mechanism for operating the barbs at the ends of the fork prongs, means for adjusting the trip mechanism so that the several barbs will operate in perfect unison, means for adjusting the position of some of the prongs in a multiple-prong fork so as to increase the capacity of the fork when used in short hay or straw, and to provide a multiple-prong fork which may be readily taken down so as to occupy but little space in shipping or storage.

In the accompanying drawings, Figure 1 is a perspective view of a four-prong fork embodying my invention, Fig. 2 is a horizontal section of the same on a plane above the trip mechanism, Fig. 3 is a detail plan view of the central portion of the main cross-frame, Fig. 4 is a similar detail of the stay-frame, Fig. 5 is a detail vertical section showing the central portions of the main cross-frame and of the stay-frame, Fig. 6 is a side view of a two-prong fork embodying the invention, certain parts being broken away, Fig. 7 is a horizontal section of the same on a plane above the trip mechanism, Fig. 8 is a detail section on the plane of the line $x$—$x$ of Fig. 6, Fig. 9 is a detail vertical section through one of the prongs, showing the barb in release position, Fig. 10 is a detail vertical section on the plane of the line $y$—$y$ of Fig. 9, intermediate portions of the prong being broken away, and Fig. 11 is a detail transverse section of one of the prongs on the plane of the line $z$—$z$ of Fig. 9.

In the structure shown in Fig. 1 there is a cross-frame consisting of bars 1 and 2 arranged at right angles to each other, the upper bar 1 having a notch in its lower edge, the lower bar 2 having a notch in its upper edge, and each of the bars fitting into the notch in the other bar. A U-bolt 3 fits diagonally across the juncture of the frame-bars, as shown in Figs. 3 and 5, a plate 4 extending across the top of the bar 1 from one side of the U-bolt to the other, a similar plate 5 extending across beneath the bar 2, and nuts 6 being provided on the lower ends of the bolt by which the plates and bars are secured firmly together. The ends of the frame-bars 1 and 2 are turned downwardly, the ends of the bar 1 extending between the side-bars of the prongs 7, and the ends of the bar 2 extending between the side-bars of the prongs 8. The prongs 7 are rigidly secured to the bar 1 by rivets 9, and the prongs 8 are pivotally connected to the bar 2 by rivets 10. Beneath the cross-frame and extending parallel therewith is the stay-frame of which the principal member is a channel-bar 11 of which the ends are secured to the side-bars of the prongs 7, as shown. At the center of the channel-bar 11, and fitting around the lower side thereof, is a block 12 of which the ends form lugs 13 extending transversely at the sides of the channel-bar. The prongs 8 are adjustably connected with said lugs 13 by the stay-rods 14, of which the outer forked ends are connected with said prongs, and the inner forked ends straddle the lugs 13, as shown in Figs. 4 and 5. The inner end portions of the stay-rods have several transverse openings therein, and bolts 15 are passed through said openings to pivotally connect the rods with the lugs 13. When the bolts are passed through the outermost openings, as shown in Figs. 2, 4 and 5, the prongs 8 are held parallel with each other. When the bolts are passed through the openings nearer to the inner ends of the rods, said prongs 8 are spread outwardly so as to diverge toward their lower ends. The block 12 is secured in position by means of the center-bolt 16 which passes up through the block and channel-bar, and the upper threaded end of the bolt is screwed into the lower plate 5 of the U-bolt connection for the frame-bars 1 and 2.

Each of the prongs 7 and 8 consists of two flat parallel side-bars disposed in spaced relation to each other, and at their lower ends said side-bars are jointed together and pointed so as to readily enter the hay or straw to be lifted by the fork. At the lower ends of the flat spaces between the side-bars the barbs 17 are pivotally mounted on transverse pins 18. The barbs are so formed that they may be turned on their pivots to positions approximately parallel with the prongs, as shown in Fig. 9, and when in this position they are completely sheathed between the side-bars. To the upper ends of the barbs are pivotally connected the lower ends of the trip-bars 19 which extend upwardly between the side-bars and at their upper ends are pivotally connected to the lock-levers 20. Said lock-levers are approximately triangular in form, are pivoted on pins 21 passing through the upper corners thereof just below the ends of the frame-bars 1 and 2, and to the inner corner of each lever is pivotally connected the outer end of one of the trip-rods 22. Said trip-rods extend inwardly from the lock-levers, and each of the rods is threaded at its inner end and is screwed into the upturned portion of one of the connector-plates 23 and 24. The connector-plates are each pivotally connected with an arm of the trip-lever 25. The trip-lever rests on the upper side of the stay-frame, being pivoted on the center-bolt 16 so as to be swingable in a horizontal plane about the axis of said bolt. The trip-lever has one arm 26 which is longer than the others, and the outer portion of said arm is extended upwardly to a plane slightly below the main cross-frame. To the end of the arm 26 a rope 27 or the like is attached and extends therefrom through an eye-piece 28 secured at the upper end of one of the prongs 7 by means of the rivets 9, as shown in Fig. 8. When the arm 26 of the trip-lever is moved to the left, or away from the eye-piece 28, the trip-rods are each moved inwardly, the lock-levers are swung inwardly from positions such as shown in Fig. 9 to positions such as shown in Fig. 6, the trip-bars 19 are pushed downwardly, and the barbs 17 thus moved to substantially horizontal positions as shown in Figs. 1 and 6. The trip-bars 19 have a slight lateral bend therein near their lower ends, so that when the parts are in the positions just described the greater part of said trip-bars lie between the side-bars of the prongs. Downward pressure of the load upon the inwardly extending portions of the barbs causes an upward thrust upon the trip-bars, and said thrust is received upon the lock-levers in a direction radial to the pivot-pins 21 so that there is no tendency to rotate the lock-levers about their pivots. In other words, the pins connecting the trip-bars and lock-levers are on dead-centers when the barbs are in the horizontal or "set" position.

Movement of the trip-lever to the right from the position shown in Figs. 1 and 2, forces the trip-rods and lock-levers outwardly, pulls upwardly on the trip-bars 19, and thus moves the barbs to the release position shown in Fig. 9. The trip-lever is usually moved to the right by pulling on the trip-rope 27, since at the times that it is desired to release the load the fork is distant from the operator.

Should the uniformity of the connections from the trip-lever to the barbs be disturbed, as by bending or wear of some of the parts, so that one or more of the barbs will not reach full release position at the same time as the others, and thus not be properly sheathed in the prongs, such condition may be quickly remedied by varying the lengths of the members connecting the trip-lever and lock-levers. The connecting-plates 23 and 24 form, in effect, a continuation of the trip-rods 22, each rod and its connector-plate forming a connecting member of variable length between the trip-lever and the respective lock-lever. To vary the length of such connecting member it is merely necessary to disconnect the plate from the trip-lever, rotate the plate about the rod to screw it further on or off the same, and then again connect the plate to the trip-lever. The plates 24, which form parts of the connections to the barbs on the adjustable prongs 8, are provided with several holes for engagement with the connecting-pins on the trip-lever. Thus when said prongs 8 are spread out to the diverging position for use in short straw, as before described, a similar adjustment is made of the plates 24 upon the trip-lever, so that the barbs on the adjustable prongs will still be operated in unison with the barbs on the fixed prongs 7.

In the two-prong fork shown in Figs. 6 and 7 the structure is essentially the same as that of the four-prong fork, except that there is omitted therefrom the bar 2 of the cross-frame, the adjustable prongs 8, the stay-rods 14 and block 12 of the stay-frame, and two of the arms of the trip-lever. In place of the U-bolt 3 there is a U-shaped clip 30 secured upon the central part of the frame-bar 1, the center-bolt 16 connecting said clip and the channel-bar 11. In the use of the two-prong fork the hook of the hoisting mechanism is engaged with the bar 1 between the sides of the U-clip 30, whereas in the use of the four-prong fork the hook of the hoisting device is engaged directly with the U-bolt 3.

It will be apparent that for shipping or storage the four-prong fork may be readily taken apart so that all its members will lie flat and thus occupy but little space. In the two-prong fork all the parts lie substantially in a single plane when the trip-lever is turned to the release position. It will also be seen that, owing to the small vertical space occupied by the trip mechanism, the capacity of the fork is very large in proportion to its height, as the prongs may be inserted into the hay up to the stay-frame and thus almost the entire length thereof utilized in carrying the load.

Now, having described my invention, what I claim and desire to secure by Letters Patent is:

1. In a multiple-prong hay fork, a horizontal cross-frame, a stay-frame arranged below and parallel with the cross-frame, prongs having their upper portions rigidly connected with both the cross-frame and stay-frame, other prongs having their upper ends pivotally connected with the cross-frame and having parts adjoining the upper end connected adjustably with the stay-frame, barbs pivoted on the prongs, a trip-lever, means connecting the trip-lever with each of the barbs, and means for varying the connections between the trip-lever and the barbs on the adjustable prongs.

2. In a hay fork, a plurality of vertical prongs, transverse members connecting said prongs to each other at their upper ends, barbs pivoted on the prongs near the points thereof, lock-levers pivoted on the prongs near the transverse members, said lock-levers being movable in vertical planes, each lock-lever being substantially triangular in form and having one corner extending inwardly, the upper corner being pivoted to the prong, bars connecting the lower corners of the lock-levers to the respective barbs, a trip-lever pivoted at the center of the transverse members and movable in a horizontal plane, and rods connecting the trip-lever to the inner corners of the lock-levers.

3. In a hay fork, a plurality of prongs, a cross-frame and a stay-frame connecting the upper end portions of the prongs to each other, barbs pivoted on the prongs near the points thereof, lock-levers pivoted on the prongs near the stay-frame, means connecting the barbs and lock-levers, a trip-lever pivoted on a vertical axis at the center of the stay-frame, said lever having an arm for each of the prongs, and members connecting the arms of the trip-levers to the lock-levers for the respective prongs, said connecting members each comprising a plate pivotally connected with the trip-lever, and a rod screwed into said plate and connected at its opposite end to the lock-lever.

In testimony whereof I have hereunto subscribed my name in the presence of two witnesses.

HERMAN UHE.

Witnesses:
ERNEST RUFF,
C. B. TOWER.

Copies of this patent may be obtained for five cents each, by addressing the "Commissioner of Patents, Washington, D. C."